(12) United States Patent
Arbore et al.

(10) Patent No.: US 7,054,061 B2
(45) Date of Patent: May 30, 2006

(54) SPLIT-BAND AMPLIFYING APPARATUS USING A DEPRESSED-PROFILE FIBER AMPLIFIER

(75) Inventors: Mark A. Arbore, Los Altos, CA (US); Jeffrey D. Kmetec, Palo Alto, CA (US); Yidong Zhou, Santa Clara, CA (US)

(73) Assignee: Lightwave Electronics Mountain View, CA (US)

( * ) Notice: Subject to any disclaimer, the term of this patent is extended or adjusted under 35 U.S.C. 154(b) by 525 days.

(21) Appl. No.: 10/346,960

(22) Filed: Jan. 17, 2003

(65) Prior Publication Data

US 2003/0169484 A1 Sep. 11, 2003

Related U.S. Application Data

(63) Continuation-in-part of application No. 10/095,303, filed on Mar. 8, 2002.

(51) Int. Cl.
*H01S 3/00* (2006.01)
*G02B 6/02* (2006.01)

(52) U.S. Cl. .................................... 359/341.1; 385/127
(58) Field of Classification Search .............. 359/341.1; 385/127
See application file for complete search history.

(56) References Cited

U.S. PATENT DOCUMENTS

| | | | |
|---|---|---|---|
| 4,515,436 A | 5/1985 | Howard et al. | |
| 4,764,933 A | 8/1988 | Kozlovsky et al. | |
| 5,056,888 A | 10/1991 | Messerly et al. | |
| 5,059,230 A | 10/1991 | Mollenauer et al. | |
| 5,260,823 A | 11/1993 | Payne et al. | |
| 5,323,404 A | 6/1994 | Grubb | |
| 5,392,154 A | 2/1995 | Chang et al. | |
| 5,452,116 A | 9/1995 | Kirkby et al. | |
| 5,473,714 A | 12/1995 | Vengsarkar | |
| 5,673,342 A | 9/1997 | Nelson et al. | |
| 5,801,858 A | 9/1998 | Roberts et al. | |
| 5,818,630 A | 10/1998 | Fermann et al. | |
| 5,838,867 A | 11/1998 | Onishi et al. | |
| 5,867,305 A | 2/1999 | Waarts et al. | |
| 5,880,877 A | 3/1999 | Fermann et al. | |
| 5,892,615 A | 4/1999 | Grubb et al. | |

(Continued)

OTHER PUBLICATIONS

L.G. Cohen et al., "Radiating Leaky–Mode Losses in Single–Mode Lightguides with Depressed–Index Claddings," IEEE Journal of Quantum Electronics, vol. QE–18, No. 10, Oct. 1982, pp. 1467–1472.

Ishikawa et al., "Novel 1500 nm–Band EDFA with Discrete Raman Amplifier," ECOC–2001, Post Deadline Paper.

Stolen et al, "Short W–Tunneling Fibre Polarizers," Electronics Letters, vol. 24, 1988, pp. 524–525.

MacCormack et al., "High–speed, high–power double–clad fiber amplifiers" CLEO 1998, Technical Digest. May 3–8, 1998.

*Primary Examiner*—Mark Hellner
(74) *Attorney, Agent, or Firm*—Lumen Intellectual Property Services, Inc.

(57) ABSTRACT

A split-band amplifying apparatus that has a first section for amplifying a long wavelength band of an optical signal and a second section equipped with a fiber amplifier for amplifying a short wavelength band of the optical signal. The fiber amplifier in the second section uses a short-pass fiber with a depressed cladding cross-section and core doped with an active material, e.g., Erbium, and pumped to a high relative inversion D. The split-band amplifying apparatus can be used to amplify signals whose short wavelength band includes at least a portion of the S-band and whose long wavelength band includes at least a portion of the C- and/or L-band.

21 Claims, 5 Drawing Sheets

U.S. PATENT DOCUMENTS

| | | |
|---|---|---|
| 5,930,030 A | 7/1999 | Scifres |
| 5,933,271 A | 8/1999 | Waarts et al. |
| 6,021,141 A | 2/2000 | Nam et al. |
| 6,049,417 A | 4/2000 | Srivastava et al. |
| 6,118,575 A | 9/2000 | Grubb et al. |
| 6,154,321 A | 11/2000 | Melville et al. |
| 6,181,465 B1 | 1/2001 | Grubb et al. |
| 6,212,310 B1 | 4/2001 | Waarts et al. |
| 6,278,816 B1 | 8/2001 | Keur et al. |
| 6,301,271 B1 | 10/2001 | Sanders et al. |
| 6,307,994 B1 | 10/2001 | Paek et al. |
| 6,563,995 B1 * | 5/2003 | Keaton et al. .............. 385/127 |
| 6,633,429 B1 * | 10/2003 | Kinoshita et al. ........ 359/337.1 |

\* cited by examiner

SPLIT-BAND AMPLIFYING APPARATUS USING A DEPRESSED-PROFILE FIBER AMPLIFIER

RELATED APPLICATIONS

This application is a continuation-in-part of U.S. application Ser. No. 10/095,303 filed on Mar. 8, 2002.

FIELD OF THE INVENTION

The present invention relates generally to split-band amplifying apparatus that amplifies optical signals whose wavelength band covers a short wavelength band such as the S-band and a long wavelength band such as the C-band, and more particularly to a split-band amplifying apparatus that uses depressed-profile fiber for amplifying the short wavelength band.

BACKGROUND OF THE INVENTION

The problem of amplifying optical signals for long distance transmission was successfully addressed by the development of Erbium doped fiber amplifiers (EDFAs). An EDFA consists of a length of silica fiber with the core doped with ionized atoms ($Er^{3+}$) of the rare earth element Erbium. The fiber is pumped with a laser at a wavelength of 980 nm or 1480 nm. The doped, pumped fiber is optically coupled with the transmission fiber so that the input signal is combined with the pump signal in the doped fiber. An isolator is generally needed at the input and/or output to prevent reflections that would convert the amplifier into a laser. Early EDFAs could provide 30 to 40 dB of gain in the C-band extending between 1530 to 1565 nm with noise figures of less than 5 dB. Recently, EDFAs have been developed that can provide similar performance in the L-band (1565 to 1625 nm) as well as in the C-band.

There is great interest in developing a broad or wide band amplifier that can amplify optical signals spanning the C- and L-bands and shorter wavelengths in the so-called "S-band" or "short-band". Although poorly defined at present, the S-band is considered to cover wavelengths between about 1425 nm and about 1525 nm. Unfortunately, the gain in the S-band typically observed in EDFAs is limited by several factors, including incomplete inversion of the active erbium ions and by amplified spontaneous emissions (ASE) or lasing from the high gain peak near 1530 nm. Unfortunately, at present no efficient mechanism exists for suppressing ASE at 1530 nm and longer wavelengths in an EDFA.

The prior art offers various types of waveguides and fibers in which an EDFA can be produced. Most waveguides are designed to prevent injected light from coupling out via mechanisms such as evanescent wave out-coupling (tunneling), scattering, bending losses and leaky-mode losses. A general study of these mechanisms can be found in the literature such as L. G. Cohen et al., "Radiating Leaky-Mode Losses in Single-Mode Lightguides with Depressed-Index Claddings", IEEE Journal of Quantum Electronics, Vol. QE-18, No. 10, October 1982, pp. 1467–72. U.S. Pat. Nos. 5,892,615 and 6,118,575 teach the use of W-profile fibers similar to those described by L. G. Cohen, or QC fibers to suppress unwanted frequencies and thus achieve higher output power in a cladding pumped laser. Such fibers naturally leak light at long wavelengths, as discussed above, and are more sensitive to bending than other fibers.

In producing an EDFA for the S-band the relatively high losses and low gains over the S-band render the selection of fiber and fiber profile even more difficult. In fact, the problems are so severe that the prior art teaches interposition of external filters between EDFA sections to produce an S-band EDFA. For example, Ishikawa et al. disclose a method of fabricating an S-band EDFA by cascading five stages of silica-based EDFA and four ASE suppressing filters in Ishikawa et al., "Novel 1500 nm-Band EDFA with discrete Raman Amplifier", ECOC-2001, Post Deadline Paper. In Ishikawa et al.'s experimental setup, the length of each EDA is 4.5 meters. The absorption of each suppressing filter at 1.53 µm is about 30 dB and the insertion losses of each suppressing filter at 1.48 µm and 0.98 µm are about 2 dB and 1 dB respectively. The pumping configuration is bi-directional, using a 0.98 µm wavelength to keep a high inversion of more than $D \geq 0.7$ (D, relative inversion). The forward and backward pumping powers are the same and the total pumping power is 480 mW. Ishikawa et al. show a maximum gain of 25 dB at 1518.7 nm with 9 dB gain tilt.

This method is relatively complicated and not cost-effective, as it requires five EDFAs, four ASE suppressing filters and high pump power. Also, each of the ASE suppressing filters used in Ishikawa et al.'s method introduces an additional insertion loss of 1–2 dB. The total additional insertion loss is thus about 4–8 dB.

In U.S. Pat. No. 6,049,417 Srivastava et al. teach a wide band optical amplifier which employs a split-band architecture. This amplifier splits an optical signal into several independent sub-bands that then pass in parallel through separate branches of the optical amplifier. Each branch may be optimized for the sub-band that traverses it. In one embodiment Srivastava et al. teach to equip one of the branches with a number of S-band EDFAs and a number of gain equalization filters (GEFs) interposed between the S-band EDFAs to obtain amplification in the S-band. The other sub-bands in this embodiment have EDFAs for amplifying the C- and L-bands respectively. Unfortunately, the S-band branch of this wide band amplifier suffers from similar disadvantages as discussed above in conjunction with Ishikawa.

In view of the above, it would be an advance in the art to provide a wide band amplifier that amplifies optical signals spanning the S-, C- and L-bands and exhibits high efficiency in the S-band. Specifically, it would be an advance to provide such wide band amplifier that amplifies optical signals in the S-band without requiring many filters and takes full advantage of a minimum number of pump sources.

OBJECTS AND ADVANTAGES

In view of the shortcomings of the prior art, it is a primary object of the present invention to provide a wide band amplifier for optical signals spanning a long wavelength band such as the C- and/or L-band and a short wavelength band such as the S-band. In particular, it is an object of the invention to provide a wide band amplifier that can use Er-doped fiber amplifiers (EDFAs) in conjunction with an efficient pumping arrangement.

It is another object of the invention to provide a wide band amplifier that uses a minimum number of parts especially in the S-band.

Yet another object of the invention is to provide a method for designing wide band fiber amplifiers.

These and numerous other advantages of the present invention will become apparent upon reading the following description.

SUMMARY

The objects and advantages of the invention are achieved by a split-band amplifying apparatus that has a first section for amplifying a long wavelength band of an optical signal and a second section equipped with a fiber amplifier for amplifying a short wavelength band of the optical signal. The fiber amplifier in the second section has a core with a core cross-section and a refractive index $n_o$. An active material is doped in the core. The core is surrounded by a depressed cladding that has a depressed cladding cross-section and a refractive index $n_1$. The depressed cladding is surrounded by a secondary cladding that has a secondary cladding cross-section and a refractive index $n_2$. A pump source is provided for pumping the active material to a high relative inversion D, such that the active material exhibits positive gains in the short wavelength band and high gains in the long wavelength band. The core cross-section, the depressed cladding cross-section and refractive indices $n_o$, $n_1$, and $n_2$ are selected to produce a roll-off loss curve about a cutoff wavelength $\lambda_c$, such that the roll-off loss curve yields losses at least comparable to the high gains in the long wavelength band and losses substantially smaller than the positive gains in the short wavelength band. In a preferred embodiment the active material is Erbium such that the fiber amplifier is a first Erbium-doped fiber amplifier (EDFA).

The short and long wavelength bands can be selected based on the application. For example, in telecommunications the short wavelength band can be chosen to contain at least a portion of the S-band and the long wavelength band can be chosen to contain at least a portion of the C-band. With this choice of wavelength bands the cutoff wavelength $\lambda_c$ is set at a crossover wavelength between the S-band and the C-band, e.g., at about 1530 nm. Of course, the long wavelength band can contain an even wider range of wavelengths, e.g., it can also contain at least a portion of the L-band.

In the preferred embodiment, the first section of the split-band amplifying apparatus that is designed for amplifying the long wavelength band has a second Erbium-doped fiber amplifier. Thus, both first and second sections utilize second and first EDFAs respectively for amplifying the optical signal. Furthermore, a common pump source can be used for delivering pump radiation to the first and second EDFAs. For example, the common pump source can be a laser diode delivering pump radiation at about 980 nm.

The split-band amplifying apparatus can be designed in many different ways. In one embodiment the first and second sections of the apparatus share an overlapping segment. In this embodiment the overlapping segment can contain the second EDFA for amplifying the long wavelength band. Alternatively, the first and second sections can be separate and form separate branches of the apparatus.

In accordance with a method of the invention, the split-band amplifying apparatus is used to amplify optical signals spanning the short and long wavelength bands. When first and second sections of the apparatus use EDFAs for amplifying the optical signal, it is convenient to co-pump and/or counter-pump the EDFAs. The EDFAs can be co-pumped and/or counter-pumped from the same source or from separate sources.

A detailed description of the invention and the preferred and alternative embodiments is presented below in reference to the attached drawing figures.

DETAILED DESCRIPTION

Figure 1:
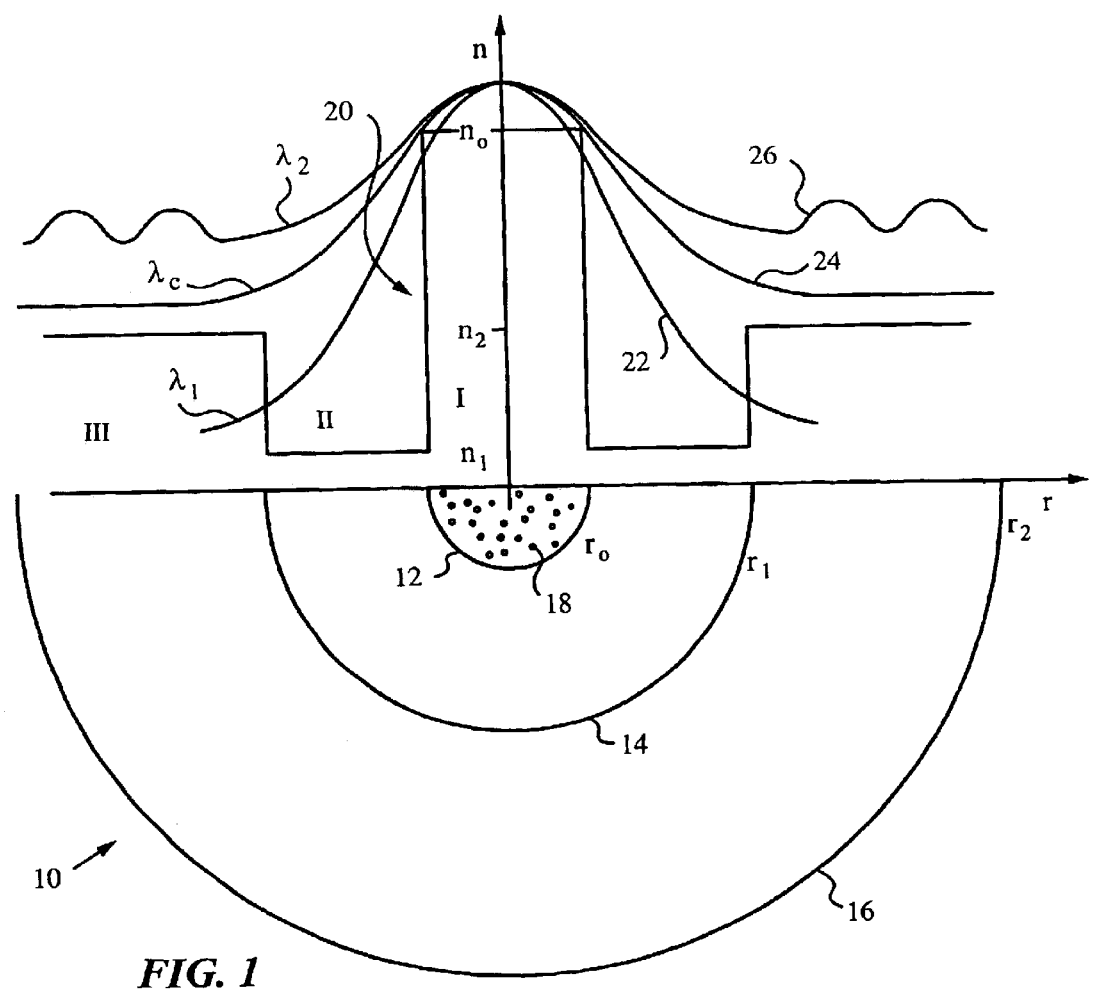
FIG. 1 is a diagram illustrating a depressed-profile fiber and its guided and unguided modes according to the invention.
Figure 2:
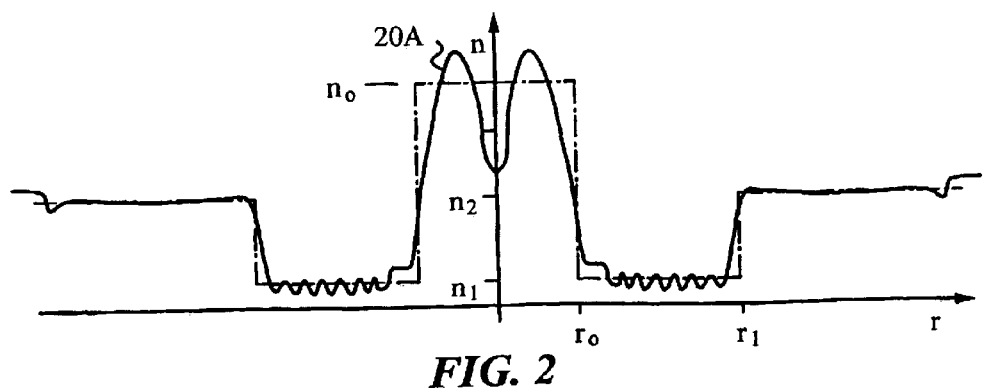
FIG. 2 is a graph illustrating a typical index profile in the fiber of FIG. 1.

The instant invention will be best understood by first reviewing the principles of generating a roll-off loss curve in a depressed profile or W-profile fiber 10 as illustrated in FIGS. 1–2. FIG. 1 is a diagram illustrating a portion of a cross-section of a fiber 10 having a core 12 surrounded by a depressed cladding 14. Depressed cladding 14 is surrounded by a secondary cladding 16. Core 12 has a circular cross-section, as do depressed cladding 14 and secondary cladding 16. A region I associated with core 12 extends from $0 \leq r \leq r_0$, depressed cladding 14 and secondary cladding 16 occupy regions II, III extending between $r_o \leq r \leq r_1$ and $r \geq r_1$. Core 12 has an index of refraction $n_o$, depressed cladding 14 has an index of refraction $n_1$ and secondary cladding 16 has an index of refraction $n_2$. The graph positioned above the partial cross-section of fiber 10 illustrates an average index profile 20 defining a W-profile in fiber 10. In the present embodiment fiber 10 is a single mode fiber.

Fiber 10 has an active material 18 doped in core 12. Active material 18 is a lasing medium such as a rare earth ion or any other lasant that exhibits high gains in a long wavelength band and positive gains in a short wavelength band. Specifically, when pumped to a high relative inversion D, the high gains of active material 18 in the long wavelength band cause amplified spontaneous emissions (ASE) or lasing which reduces the population inversion of lasant 18 and thus reduces the positive gains in the short wavelength band, making it impossible to effectively amplify signals in the short wavelength band.

FIG. 2 illustrates a W-profile 20A as is obtained with normal manufacturing techniques. For the purposes of the invention it is sufficient that the radially varying index of core 12 have an average value equal to $n_o$. Likewise, it is sufficient that indices of depressed cladding 14 and secondary cladding 16 average out to the values $n_1$ and $n_2$. The average index $n_o$ of core 12 is significantly higher than index $n_1$ of depressed cladding 14 and index $n_2$ of secondary cladding 16. The selection of appropriate values of indices $n_o$, $n_1$, $n_2$ and radii $r_o$, $r_1$, $r_2$ is made to achieve certain guiding properties of fiber 10, as required by the instant invention. Specifically, profile 20 is engineered to have a fundamental mode cutoff wavelength $\lambda_c$ such that light in the fundamental mode at wavelengths smaller than $\lambda_c$ is retained in core 12 while light in fundamental mode at wavelength $\lambda_c$ or longer wavelengths is lost to secondary cladding 16 over a short distance. This objective is accomplished by appropriately engineering W-profile 20A.

Fundamental mode cutoff wavelength $\lambda_c$ of fiber 10 is a wavelength at which the fundamental mode (the $LP_{01}$ mode) transitions from low-losses to high losses in core 12, i.e., is cut off from core 12. First, the fundamental mode cutoff wavelength $\lambda_c$ for fiber 10 is set in accordance to selection rules for cross-sections and refractive indices $n_o$, $n_1$ and $n_2$ of fiber 10 as derived from Maxwell's equations. In the weak guiding approximation (which is valid when the indices of refraction of core 12 and claddings 14, 16 are all relatively close to each other), the Maxwell vector equations can be replaced with a scalar equation. The scalar $\psi$ represents the strength of the transverse electric field in the fiber. For more information, see for example G. Agrawal, "Nonlinear Fiber Optics" (Academic, San Diego, 1995), D. Marcuse, "Light Transmission Optics" (Van Nostrand, Princeton, 1972), and D. Marcuse, "Theory of Dielectric Optical Waveguides" (Academic, New York, 1974).

For convenience, let us define the following parameters:

$$u_0 = \sqrt{n_0^2 - n_2^2}$$

and $$u_1 = \sqrt{n_2^2 - n_1^2} \quad (1)$$

The scalar field $\psi$ inside fiber 10 satisfies a wave equation whose solutions are Bessel functions and modified Bessel functions. For the fundamental mode supported by fiber 10, inside core 12 the scalar field $\psi$ is thus:

$$\psi = J_0(\kappa r), \quad 0 \leq r \leq r_0 \text{ (region I)} \quad (2)$$

where $\kappa$ is an eigenvalue that needs to be determined, and $J_0$ is the zeroth Bessel's function.

Inside depressed cladding 14, the scalar field $\psi$ is:

$$\psi = A\, K_0(\beta r) + B\, I_0(\beta r), \quad r_0 \leq r \leq r_1 \text{ (region II)} \quad (3)$$

where A and B are constants to be determined, $\beta^2 = (u_0^2 + u_1^2)(2\pi/\lambda)^2 - \kappa^2$, and $K_0$ and $I_0$ are the modified Bessel's functions. Here $\lambda$ is the vacuum wavelength of the light.

In secondary cladding 16, we obtain:

$$\psi = C\, K_0(\gamma r), \quad r \geq r_1 \text{ (region III)} \quad (4)$$

Here C is another constant, and $\gamma^2 = u_0^2 (2\pi/\lambda)^2 - \kappa^2$. A, B, C, and $\kappa$ are found using the boundary conditions, which require that $\psi$ and its first derivative are both continuous at $r_0$ and $r_1$.

It can be shown that fundamental mode cutoff wavelength $\lambda_c$ is a wavelength $\lambda$ at which $\gamma = 0$. (See for example, Cohen et al., IEEE J. Quant. Electron. QE-18 (1982) 1467–1472.)

For additional convenience, let us define the following parameters:

$$x = \frac{2\pi u_0 r_0}{\lambda_c}, \quad \rho = u_1/u_0, \quad s = r_1/r_0. \quad (5)$$

Now, fundamental mode cutoff wavelength $\lambda_c$ can be determined if parameter x is determined. That determination can be made with the aid of algebra known to a person skilled in the art, since parameter x is the root of the following equation:

$$\rho J_0(x) K_1(\rho s x) I_1(\rho x) - \rho J_0(x) I_1(\rho x) K_1(\rho s x) - J_1(x) K_1(\rho s x) I_0(\rho x) - J_1(x) I_1(\rho s x) K_0(\rho x) = 0. \quad (6)$$

Three observations should be made regarding the parameter x. First, x does not exist for all values of s and $\rho$. For example, for $\rho = 1$ and $s \leq \sqrt{2}$, there is no x that satisfies Eq. (6). This means that all wavelengths are guided in core 12 in this regime. The criterion that Eq. (6) have a solution is:

$$s^2 \geq 1 + 1/\rho^2. \quad (7)$$

Second, for practical applications x cannot be too small. This is because, according to Eq. (5), the parameter x is proportional to radius $r_0$ of core 12, and the radius has to be large enough that it is easy to couple light into and out of core 12. (A smaller core 12 also makes the nonlinear effects stronger, which is often a disadvantage.) Therefore, since $x = 2\pi u_0 r_0/\lambda_c$, preferably $x \geq 1$. This implies that $\rho \geq 0.224$ or, in terms of the refractive indices $$\sqrt{(n_2^2 - n_1^2)/(n_2^2 - n_1^2)} \geq 0.224.$$

Figure 3:
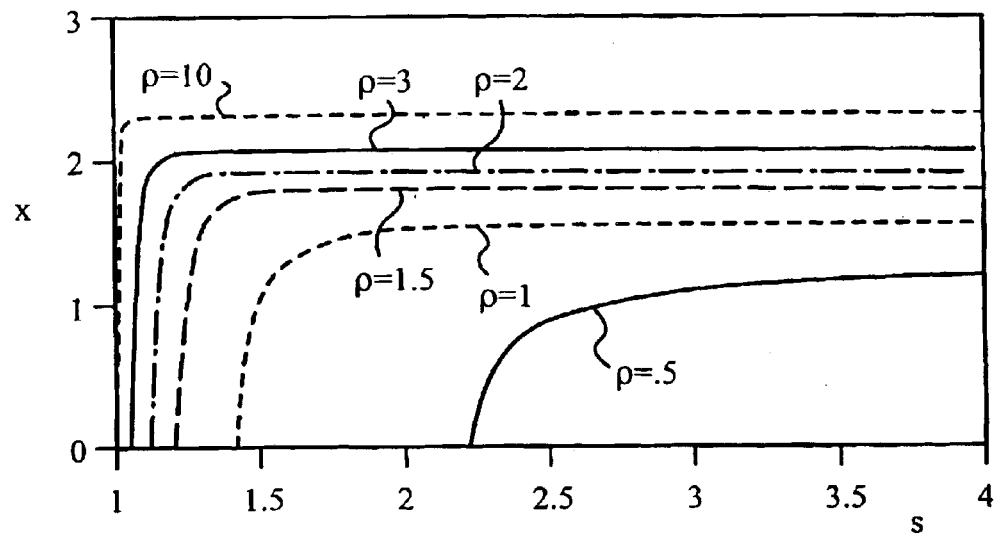
FIG. 3 is a graph illustrating x as a function of the ratio s for various values of the parameter ρ.

Third, it is evident from FIG. 3 that for larger values of s, the value of x only weakly depends on s. Thus it is advantageous to have a fiber in this region of parameter space, since a manufacturing flaw producing an error in s will have a small effect on the value of fundamental mode cutoff wavelength $\lambda_c$. Therefore, it is convenient to use the rule $s \geq 1 + 1/\rho$, or in terms of the refractive indices:

$$\frac{r_1}{r_o} \geq 1 + \sqrt{(n_o^2 - n_2^2)/(n_2^2 - n_1^2)}. \quad (8)$$

The selection of cross sections and refractive indices of core 12, depressed cladding 14 and outer cladding 16 is guided by the above rules in setting the appropriate fundamental mode cutoff wavelength $\lambda_c$. First, $\lambda_c$ can be pre-selected, e.g. a wavelength close to 1530 nm, and then convenient values are selected for $u_o$ and $r_o$. Based on these choices x is computed from equation 5, and conveniently $x \geq 1$ (otherwise the previous choices can be adjusted). Then, suitable values of s and $\rho$ are found using equation 6. A range of values for $\rho$ and s will yield desired $\lambda_c$. Typically, all values of $\rho$ are larger than 0.224. In addition, the rule of equation 8 is used to further narrow the range of suitable values of $\rho$ and s.

Finally, the values of s and $\rho$ have an additional limitation. Namely, they must be selected so that core 12 of fiber 10 has a great enough loss, e.g., 100 dB/m or even 200 dB/m or more at a wavelength $\lambda > \lambda_c$. To find the loss at wavelength $\lambda > \lambda_c$, the fiber modes for light having wavelength $\lambda > \lambda_c$ are required.

Equations (2), (3), and (4) specify the fundamental mode when $\lambda > \lambda_c$. When $\lambda > \lambda_c$, the function $\psi$ is oscillatory, rather than exponentially decaying, in secondary cladding 16. Therefore when $\lambda > \lambda_c$, Eq. (4) is replaced by:

$$\psi = C\, J_0(qr) + D\, N_0(qr), \quad r \geq r_1 \text{ (region III)} \quad (9)$$

where $N_0$ (also called $Y_0$) is the zeroth Neumann function, $q^2 = K^2 - u_0^2 (2\pi/\lambda)^2$, and C and D are constants to be determined.

There are two key items to note regarding the modes for $\lambda > \lambda_c$. First, there are five unknowns (A, B, C, D, and $\kappa$) and four boundary conditions (continuity of $\psi$ and $d\psi/dr$ at $r_0$ and $r_1$). The equations are underconstrained: $\kappa$ may be chosen to be any value between 0 and $$(2\pi/\lambda)\sqrt{u_o^2 + u_1^2}.$$

Thus, there is a continuum of states for each $\lambda > \lambda_c$, corresponding to the continuum of values that $\kappa$ may have. This situation is quite different from the case $\lambda < \lambda_c$, where four unknowns (A, B, C, and $\kappa$) are fixed by the four boundary conditions, resulting in $\kappa$ being a discrete eigenvalue having a unique value at each $\lambda < \lambda_c$.

Second, the modes specified by Eqs. (2), (3), and (9) are eigenmodes of the fiber, e.g. a W-fiber; however, these modes do not correspond to the situation that is physically realized. This is a result of Eq. (9) containing both incoming and outgoing waves, whereas in practice only outgoing waves are present (the light at wavelength $\lambda > \lambda_c$ originally propagating in core 12 radiates out).

Nevertheless, the modes of Eqs. (2), (3), and (9) can be used to estimate the losses at wavelengths greater than $\lambda_c$. First, for a given wavelength $\lambda$, find the value of $\kappa$ that minimizes $C^2 + D^2$. This corresponds to the mode that is the most long-lived within the core. (An analogy can be made between the wave equation for the scalar $\psi$ in the fiber and the quantum mechanical wave equation for a particle in a potential well. Then the quantum mechanical results can be borrowed. See for example David Bohm, "Quantum Theory", Dover 1989, Chapter 12, §14–22.)

Second, once $\kappa$ is found in the above manner, the outgoing waves can be computed from Eq. (9). These outgoing waves give a reasonable estimation of the loss from core 12 into secondary cladding 18, even when no incoming waves are present. These outgoing waves will cause beam at wavelength $\lambda > \lambda_c$ propagating in core 12 to be attenuated along the length of the fiber. If the beam has power P, then the change in power P with distance z along fiber 10 is described by the equation:

$$\frac{dP}{dz} = -\Lambda P. \qquad (10)$$

The loss is given by the coefficient $\Lambda$, which is approximately:

$$\Lambda = \frac{\lambda}{4\pi^2 n_0} \frac{C^2 + D^2}{\int_0^{r_0} r\, dr\, \psi^* \psi}. \qquad (11)$$

The loss $\Lambda$, having units of m$^{-1}$, can be converted to a loss $\beta$ in units of dB/m, using the relation:

$$\beta = 10\, \log_{10}(e) \cdot \Lambda. \qquad (12)$$

Here the term "loss" refers to radiation that leaks out of core 12 into secondary cladding 16. In fact, the radiation may not be truly lost from fiber 10, if it remains in secondary cladding 16. In some cases this will be sufficient. In other cases light from secondary cladding 16 can be out-coupled or absorbed, as necessary.

Another method for calculating the losses involves calculating the complex propagation constant of the leaky fundamental mode of fiber 10. Leaky modes are discussed in, for example, D. Marcuse, "Theory of Dielectric Optical Waveguides" (Academic, New York, 1974) Chapter 1. The loss is related to the imaginary part of the complex propagation constant of the leaky mode. The complex propagation constant, or its equivalent that is the complex effective index of refraction, may be computed using commercially available software, such as that obtainable from Optiwave Corporation of Nepean, ON, Canada.

In some cases it may be preferable to numerically solve for the modes of a given fiber rather than use the Bessel function approach outlined above, since real fibers do not have the idealized step index profile indicated by profile 20 shown in FIG. 1, but have variations from the ideal as shown by graph 20A in FIG. 2 of the actual refractive index profile obtained in practice. In particular, the most common method of single-mode fiber manufacture today involves the MOCVD process, which typically leaves an index dip in the center of core 12. Numerical solutions can, more easily than the method described above, take into account the actual variations in refractive index as a function of radius. Such numerical calculations can again give fundamental mode cutoff wavelength $\lambda_c$ and fiber losses as a function of fiber parameters including cross-sections and refractive indices, allowing fiber 10 to be designed to exhibit the desired features.

When Eq. (11) is used to estimate the loss, refractive indices $n_0$, $n_1$, and $n_2$ will in general be average indices of refraction of profile 20, since the actual indices of refraction will vary somewhat as a function of radius (see profile 20A). Also, the index of refraction n is not necessarily radially symmetric. If the cross section of fiber 10 is described by polar coordinates r and $\theta$ the refractive index may depend upon the angle $\theta$ as well as the radius r. Thus, n=n(r,$\theta$). Such an asymmetric fiber may be desirable for polarization maintenance, for example.

Here is the prerequisite for the fiber to have fundamental mode cutoff wavelength $\lambda_c$. Let R be a radius large enough that the index at radius R has substantially leveled off to the value $n_2$. Then fiber 10 will have fundamental mode cutoff wavelength $\lambda_c$ if (see B. Simon, Ann. Phys. 97 (1976), pp. 279):

$$\int_0^{2\pi} d\theta \int_0^R r\, dr (n^2(r,\theta) - n_2^2) \leq 0. \qquad (13)$$

Note that given the profile of FIG. 1, Eq. (13) becomes:

$$\pi r_0^2 u_0^2 - \pi(r_1^2 - r_0^2) u_1^2 \leq 0, \qquad (14)$$

which is equivalent to Eq. (7) above.

Fundamental mode cutoff wavelength $\lambda_c$ is the largest wavelength for which there is an eigenmode that is localized in region I. The losses for wavelengths above cutoff wavelength $\lambda_c$ can be determined, for example, by (i) solving for the modes that are not localized but include incoming and outgoing waves, (ii) for each wavelength finding the mode with the smallest outgoing intensity, and (iii) using this outgoing intensity to estimate the loss. As discussed above, other methods are also available to a person skilled in the art for calculating losses. In general, fiber 10 with a desired fundamental mode cutoff wavelength $\lambda_c$ and losses can therefore be designed by adjusting the profile n(r,$\theta$), which is equivalent to adjusting the cross-sections and refractive indices of core 12, depressed cladding 14 and secondary cladding 16.

The rules presented above will enable a person skilled in the art to set fundamental mode cutoff wavelength $\lambda_c$ by making a selection of $r_o$, $r_1$, $n_o$, $n_1$ and $n_2$. This selection of $r_o$, $r_1$, $n_o$, $n_1$ and $n_2$ provides distributed ASE suppression over the length of the fiber 10 and results in a family of loss curves with different roll-offs (with respect to wavelength). Therefore, additional constraints have to be placed on the selection of $r_o$, $r_1$, $n_o$, $n_1$ and $n_2$ to achieve the objectives of the present invention, as discussed below.

Referring back to FIG. 1, superposed on average index profile 20 is an intensity distribution of a guided fundamental mode 22 at a first wavelength $\lambda_1 < \lambda_c$. First wavelength $\lambda_1$ is contained within a short wavelength band, e.g., the S-band. A fundamental mode 24 that is no longer guided by fiber 10 is also superposed on index profile 20. Mode 24 is at cutoff wavelength $\lambda_c$. An intensity distribution of another mode 26 that is not guided by fiber 10 and exhibits an oscillating intensity distribution beyond core 12 and depressed cladding 14 is also shown. Radiation in mode 26 has a second wavelength $\lambda_2$, which is longer than cutoff wavelength $\lambda_c < \lambda_2$ and is contained in a long wavelength band, e.g., in the C- or L-band.

Figure 4:
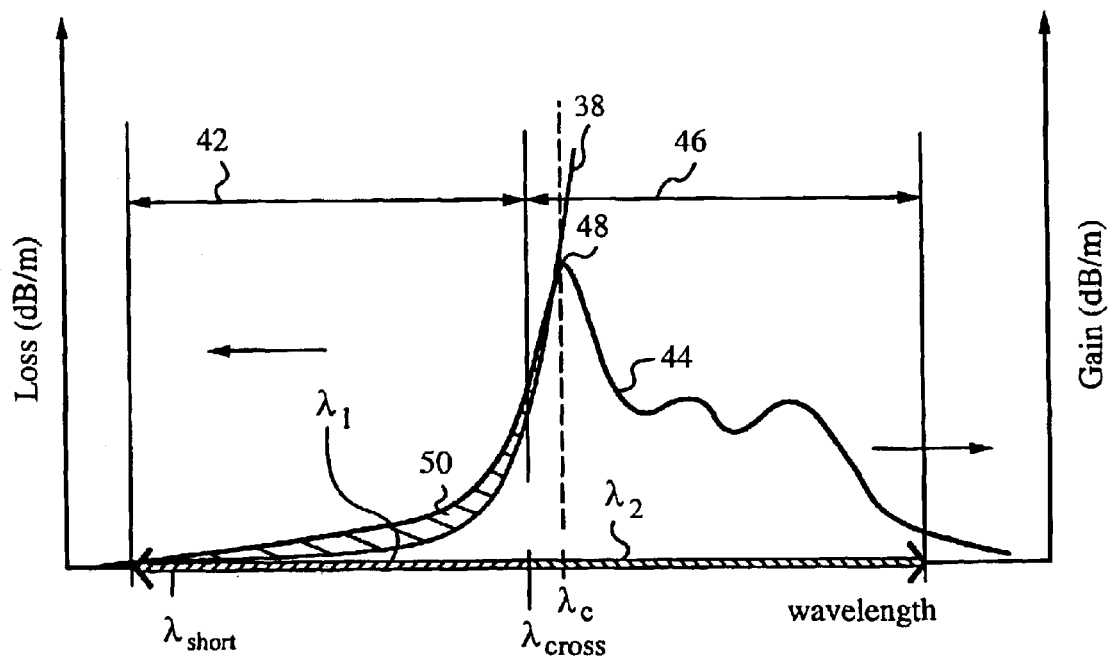
FIG. 4 is a graph illustrating appropriate selection of the core index to obtain a suitable roll-off loss curve in an Er-doped fiber amplifier (EDFA) in accordance with the invention.

FIG. 4 illustrates a gain profile 44 of active material 18, in this case Erbium, when pumped to a high relative inversion D. The S-band is designated by reference 42 and long wavelength band is designated by reference 46. A crossover wavelength $\lambda_{cross}$ between S-band 42 and long wavelength band 46 is also indicated. Gain profile 44 exhibits high gains in long wavelength band 46 and positive gains in S-band 42. In particular, high gains in long wavelength band 46 include a peak 48 at about 1530 nm that is very close to crossover wavelength $\lambda_{cross}$.

In this embodiment the cross-sections or radii of core 12, depressed cladding 14 and refractive indices $n_o$, $n_1$, and $n_2$ are selected to place cutoff wavelength $\lambda_c$ right at peak 48 just within long wavelength band 46. Additionally, the value of index $n_o$ of core 12 is selected to obtain a roll-off loss curve 38 about cutoff wavelength $\lambda_c$ set at peak 48 of high gains in long wavelength band 46. More particularly, roll-off loss curve 38 is selected to yield losses at least comparable to the high gains in long wavelength band 46 while yielding losses substantially smaller than the positive gains in S-band 42. Roll-off loss curve 38 drops below the positive gains indicated by profile 44 because of its rapid decrease or large positive slope to the left for wavelengths below cutoff wavelength $\lambda_c$. The gains thus exceed losses across entire S-band 42, as better visualized by hatched area 50. Preferably, roll-off loss curve 38 is such that the gains exceed the losses in short wavelength band 42 by at least 5 dB. For more information on selecting appropriate roll-off loss curves the reader is referred to U.S. patent application Ser. No. 10/095,303 filed on Mar. 8, 2002.

Figure 5:
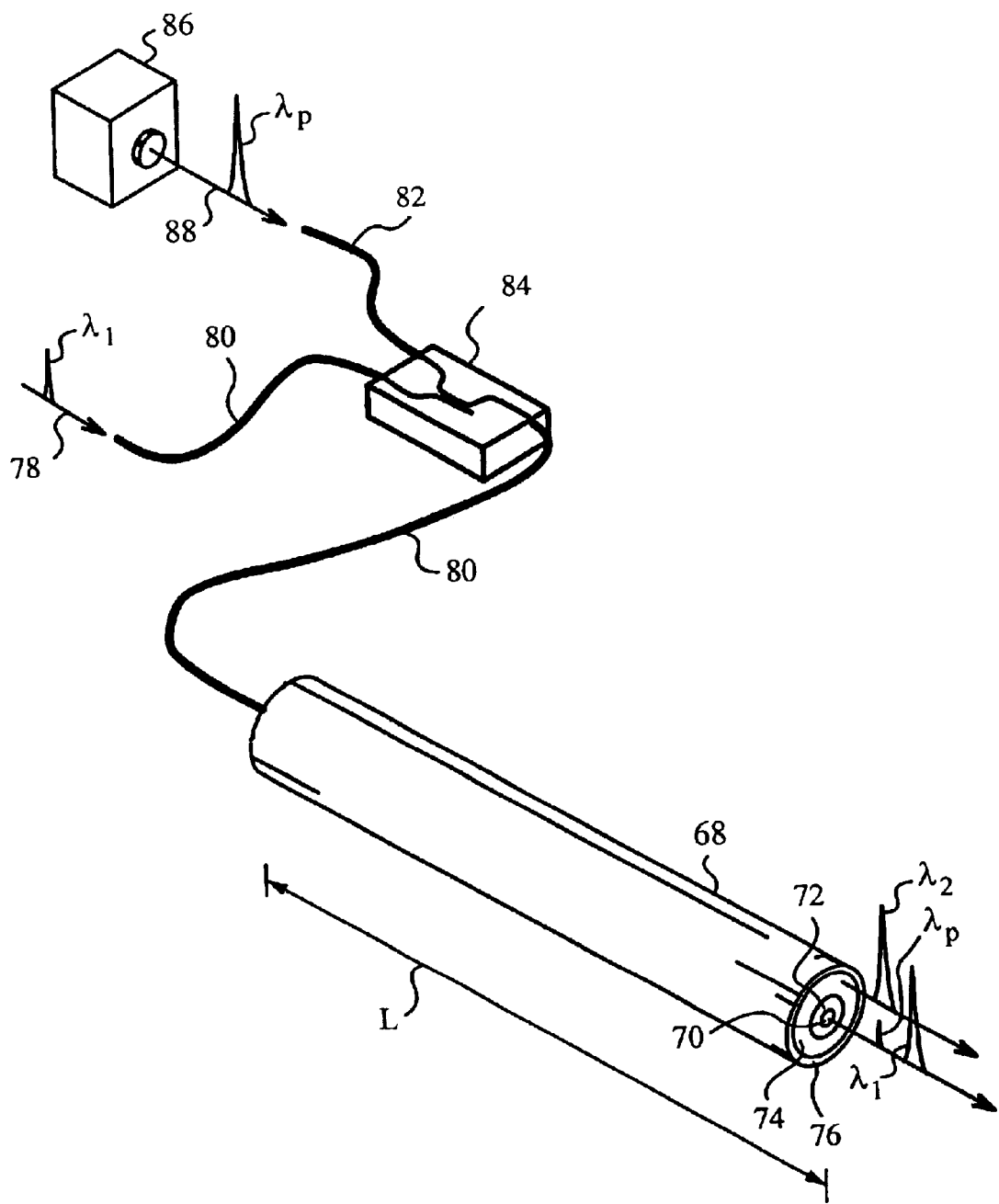
FIG. 5 is an isometric view of an S-band EDFA adapted for use in accordance with the invention.

A split-band amplifying apparatus of the invention takes advantage of W-profile fiber designed in accordance with the above rules. In fact, the apparatus of invention preferably uses W-profile fiber designed in accordance with the above rules when active material 18 is Er and the short wavelength band is the S-band or a select portion of the S-band while the long wavelength band covers the C-band and/or the L-band or a select portion or portions of these two bands. Preferably, the host material of fiber 10 is silicate-containing glass such as alumino-germanosilicate glass, lanthanum doped germanosilicate glass, aluminum/lanthanum co-doped germanosilicate glass, or phosphorus doped germanosilicate glass. For example, the split-band amplifying apparatus can use an Er-doped amplifier 68 (EDFA) using aluminogermanosilicate glass as the host material, as shown in FIG. 5. In this example, EDFA 68 is doped with a concentration of 0.1% wt. of Er in a core 70 of index $n_o$. Core 70 is surrounded by a depressed cladding 72 of index $n_1$ and a secondary cladding 74 of index $n_2$. EDFA 68 has a protective jacket 76 surrounding secondary cladding 74 to offer mechanical stability and to protect EDFA 68 against external influences.

An optical signal 78 at a first wavelength $\lambda_1$ contained within S-band 42 is delivered to EDFA 68 for amplification from a fiber 80. For example, optical signal 78 can be an information-bearing signal requiring amplification.

Fiber 80 is coupled with a fiber 82 in a wavelength combiner 84. Fiber 82 is used to couple a pump light 88 from a pump source 86 to EDFA 68. Pump source 86, preferably a laser diode, provides pump light 88 at a pump wavelength $\lambda_p$ of about 980 nm for pumping the Er ions in core 70 to achieve a high level of relative population inversion D. Parameter D varies from D=−1 indicating no population inversion to D=1 signifying complete population inversion. When D=0, exactly half of the Er ions are in the excited energy state or manifold of states, while half remain in the ground energy manifold. In this case, EDFA 68 is approximately transparent (for wavelengths near the 3-level transition at 1530 nm). For non-uniformly inverted EDFAs, parameter D is considered as the average value of inversion. In the present embodiment, the intensity of pump light 88 is determined such that it ensures a relative inversion of D≧0.7 in the Er ions.

Pump light 88 and signal light 78 are combined in combiner 84 and both delivered to EDFA 68 by fiber 80. More particularly, both optical signal and pump light 78, 88 are coupled into core 70 from fiber 80.

Core 70 and claddings 72, 74 all have circular cross sections in this embodiment. The cross sections and indices $n_o$, $n_1$, $n_2$ are selected in accordance with the method of invention to set cutoff wavelength $\lambda_c$ near 1525 nm. In other words, cutoff wavelength $\lambda_c$ is selected to be between S-band 42 and long wavelength band 46 or the C-band and L-band.

It is important that index $n_o$ of core 70 be chosen to provide for a large negative slope in effective index $n_{eff}$ with respect to wavelength, preferably about $0.008/1,000$ nm, near cutoff wavelength $\lambda_c$. As a result, the roll-off loss curve exhibits a rapid decrease for wavelengths below cutoff wavelength $\lambda_c$ ensuring that the losses in S-band 42 are lower than the positive gains. The losses produced by this roll-off loss curve increase rapidly for wavelengths larger than cutoff wavelength $\lambda_c$. Thus, the losses produced in the C- and L-bands 46 are at least comparable to the high gains.

Designing EDFA 68 in accordance with the invention will ensure that optical signal 78 at $\lambda_1$ is amplified while ASE at any wavelength $\lambda_2$ in the C- and L-bands 66, and especially at $\lambda_2$=1530 nm is rejected into cladding 74 as shown. Positive gains in S-band 42 will typically be on the order of 1 dB per meter (or, depending on fiber design and on which wavelengths within the S-band are of greatest interest, 0.2–5 dB/meter) above the losses and thus, to obtain sufficient amplification of optical signal 78, EDFA 68 requires a certain length L. The smaller the difference between the positive gains and losses in the S-band 42, the longer length L has to be to provide for sufficient amplification of optical signal 78. For a useful S-band amplification of 25 dB, the length L may need to be about 5 meters to over 100 meters.

Figure 6:
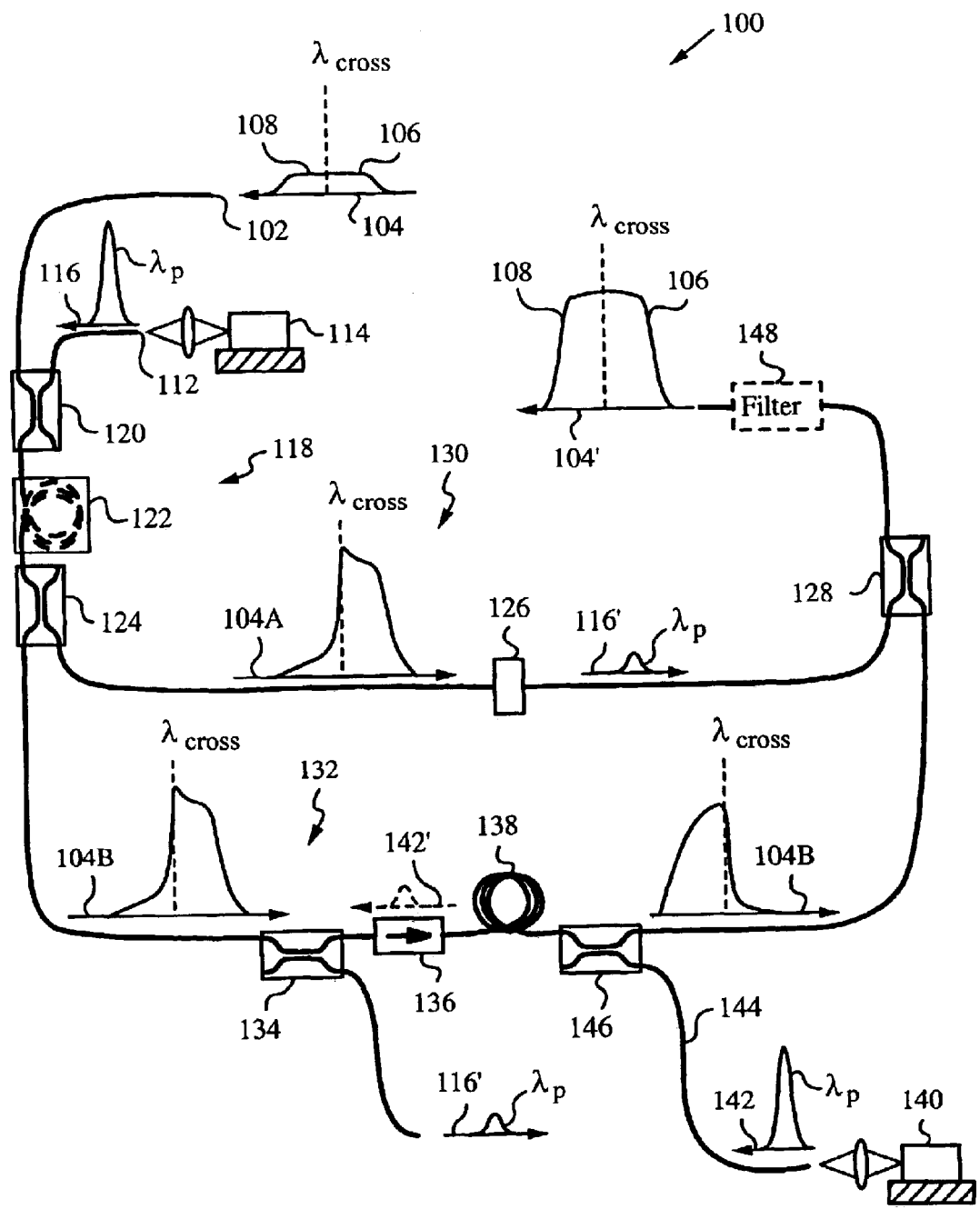
FIG. 6 is a diagram of a split-band amplifying apparatus with an S-band EDFA and a C-band EDFA and having an overlapping segment.

FIG. 6 illustrates a split-band amplifying apparatus 100 in accordance with the invention. Apparatus 100 has an input fiber 102 for receiving an optical signal 104 to be amplified. Optical signal 104 spans a long wavelength band 106 and a short wavelength band 108 separated by a crossover wavelength $\lambda_{cross}$ as indicated. Apparatus 100 also has a pump input fiber 112 for receiving a pump radiation 116 from a pump source 114. In the present embodiment, pump source 114 is a laser diode emitting pump radiation 116 at a pump wavelength $\lambda_p$=980 nm.

Apparatus 100 has a segment 118 shared by a first section 130 and a second section 132 of apparatus 100. In other words, segment 118 is where first and second sections 130, 132 overlap. Second section 132 has a fiber amplifier 138 positioned beyond segment 118 for amplifying short wavelength band 108 of optical signal 104. Preferably, fiber amplifier 138 is a first EDFA. Segment 118 has an amplifier 122 for amplifying long wavelength band 106 of optical signal 104. It should be noted that amplifier 122 does not have to be an EDFA or even a fiber amplifier.

It should be also noted that amplifier 122 should provide some amplification (or at least zero amplification, but no loss) to short wavelength band 108 while providing useful gain for long wavelength band 106. In a preferred version of apparatus 100, amplifier 122 should provide enough amplification of short wavelength band 108 so as to compensate for any losses experienced by short wavelength band 108 in components preceding fiber amplifier 138. In a further preferred version of apparatus 100, amplifier 122 should provide low-noise amplification of short wavelength band 108 so as to minimize the noise impact of any losses experienced by short wavelength band 108 in components preceding fiber amplifier 138.

Segment 118 is also equipped with a coupler 120 and a coupler 124. Coupler 120 is any suitable optical coupling device, e.g., a WDM coupler capable of joining optical signal 104 and pump radiation 116 and launching them through amplifier 122 to achieve amplification of optical signal 104. In the present embodiment amplifier 122 is a second EDFA and long wavelength band 106 spans the C-band. Coupler 124 is any suitable optical splitter, e.g., a WDM coupler capable of splitting signal 104 into two signals 104A and 104B. In the present example coupler 124 is a 50/50 WDM coupler such that signal 104 is split into signals 104A, 104B of equal intensity and spectral content. Alternatively, a coupler with a different splitting ratio or a band combiner that separates the short wavelength band 108 from the long wavelength band 106 can be used.

Coupler 124 is connected to first section 130 and to second section 132. In particular, coupler 124 is set to send signal 104A along first section 130 and signal 104B along second section 132. First section 130 contains a delay element 126, which can be a certain length of fiber for compensating delays in time of travel between first section 130 and second section 132. First and second sections 130, 132 are recombined by a coupler 128, which is preferably a band combiner for combining signals 104A and 104B in the short and long wavelength bands 108, 106 while rejecting radiation at other wavelengths such as a residual pump radiation 116'.

Second section 132 is equipped with a coupler 134 for out-coupling residual pump radiation 116' out of section 132. Coupler 134 is followed by an isolator 136 and first EDFA 138. Isolator 136 is set to pass signal 104B to first EDFA 138 and block any radiation from propagating back to segment 118.

First EDFA 138 is constructed in accordance with the above-described rules to amplify signal 104B in short wavelength band 108, i.e., in the S-band in this embodiment. A pump source 140 is provided for generating pump radiation 142 for first EDFA 138. Pump source 140 is a diode laser emitting pump radiation 142 at a pump wavelength $\lambda_p$=980 nm. An input fiber 144 and a coupler 146 are provided for delivering pump radiation 142 to first EDFA 138. Coupler 146 is connected such that pump radiation 142 is delivered from the opposite direction to that of advancing signal 104B. In other words, pump radiation 142 is counter-propagating to signal 104B in first EDFA 138. It should be noted that any residual pump radiation 142' is blocked from propagating back to segment 118 by coupler 134 and also by isolator 136. Counter-propagation of the pump provides for highly efficient pump-to-signal conversion efficiency in amplifier 138.

Coupler 146 is set to pass signal 104B amplified by first EDFA 138 within short wavelength band 108, i.e., the S-band, to coupler 128. Coupler 128 re-combines signal 104A amplified in long wavelength band 106 and signal 104B amplified in short wavelength band 108 to reconstitute an amplified optical signal 104'. An optional filter 148, e.g., a gain flattening filter (GFF), can be provided to equalize amplified optical signal 104'.

During operation, optical signal 104 enters apparatus 100 via input fiber 102 and is delivered together with pump signal 116 to second EDFA 122 in segment 118 along the same direction (in co-propagating geometry). Second EDFA 122 amplifies the portion of signal 104 in long wavelength band 106, and in preferred embodiments also provides a small degree of amplification for the portion of signal 104 in short wavelength band 108.

Coupler 124 splits signal 104 amplified in long wavelength band 106 into signals 104A and 104B and sends them into remaining, non-overlapping portions of sections 130 and 132, respectively. Signal 104A experiences no further amplification in section 130. Meanwhile, the portion of signal 104B spanning short wavelength band 108 is amplified by first EDFA 138.

Most of pump radiation 116 is preferably used up in second EDFA 122 and any residual pump radiation 116' which is potentially detrimental to the operation of pump source 140 of first EDFA 138 is separated out by coupler 134. Similarly, coupler 134 and isolator 136 block any residual pump radiation 142' from propagating back and interfering with the operation of pump source 114.

Delay element 126 ensures that amplified signals 104A and 104B are recombined with the appropriate group delay into signal 104' in combiner 128. Optional filter 148 adjusts the amplification level of signal 104' across entire wavelength band, i.e., across short and long wavelength bands 108, 106 or the S- and C-bands in this case.

Apparatus 100 is very efficient and uses a minimum number of elements to amplify signal 104. It should also be noted that short and long wavelength bands 108, 106 can be selected based on the application. Although in telecommunications short wavelength band 108 will typically contain at least a portion of the S-band, other short wavelength bands can be accommodated as well by changing the parameters of first EDFA 138 in accordance with the above-described rules. In telecommunications application long wavelength band 106 will contain at least a portion of the C-band or the L-band or both. Of course, long wavelength band 106 can span any desired long wavelength band by selecting appropriate amplifier 122 or even replacing amplifier 122 with a number of amplifiers in series or in parallel.

An additional advantage of apparatus 100 is its good noise figure. Specifically, the configuration of elements in apparatus 100 yields a good noise figure because the input signals directly enter a co-pumped EDFA with no distributed losses. In general, it is best for noise performance if the gain happens before any losses. (Losses that occur before gain add 100% to noise figure.) It is also beneficial that shared amplifier 122 is co-pumped, because this enables high levels of inversion. It is also beneficial when shared amplifier 122 length is chosen such that the inversion level of the the amplifier is nearly 100% because of minimal ASE at all wavelengths. With near perfect inversion, this stage of amplification will contribute minimally to the noise figure. Using standard Erbium-doped fibers, this approach can only provide small (about 5 dB) amounts of S-band gain without sacrificing inversion. If the fiber length is increased beyond the optimal length, then the increased inversion would negatively impact the noise figure while limiting the S-band gain (note, however that the C-band gain will continue to increase for a while.) Further increasing of the length of the fiber beyond the optimal length would ultimately lead to a reduction of the S-band gain, and eventually to net loss in the S-band. This latter condition (S-band loss) is the condition most commonly experienced in EDFAs optimized for operation in the C-band.

It is also beneficial for the noise figure that shared amplifier 122 is of traditional EDFA variety, with no fundamental mode cutoff. For this reason, it is unlikely to have any distributed losses other than those caused by Erbium absorption (i.e. by <100% inversion). This lack of distributed losses further promotes a good noise figure.

It should also be noted that the basic design of apparatus 100, splits the low-noise and amplified signal into two branches. This splitting (and its associated losses) occur after the initial small amplification, and therefore has less impact on noise figure than may have occurred had the splitting occurred before the initial small amplification. Additionally, any imperfect noise figure inherent in S-band EDFA 138 in the S-band branch is effectively de-magnified by the good-noise-figure gain of the initial small amplification.

Figure 7:
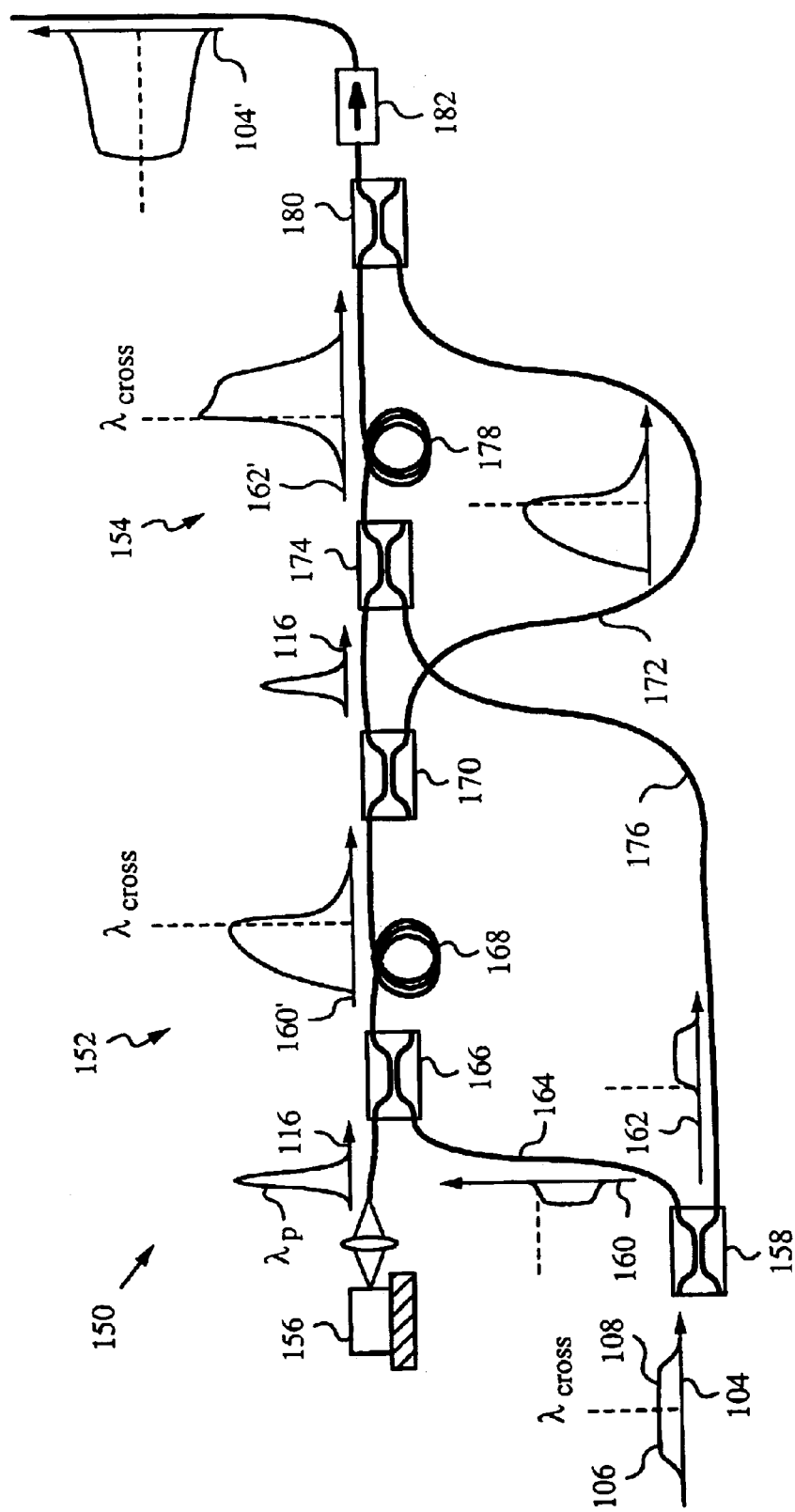
FIG. 7 is a diagram of a split-band amplifying apparatus having non-overlapping first and second sections.

The split-band amplifying apparatus can be designed in many different ways. FIG. 7 illustrates another split-band amplifying apparatus 150 having separate first and second sections 152, 154 and using one common pump source 156. In this embodiment common pump source 156 is also a diode laser emitting pump radiation 116 at pump wavelength $\lambda_p$=980 nm. In fact, elements of apparatus 150 corresponding to those of apparatus 100 are labeled by the same reference numbers.

Optical signal 104 is received by a coupler 158. Coupler 158 is set to divide signal 104 into a first signal 160 spanning short wavelength band 108 and a second signal 162 spanning long wavelength band 106. First signal 160 is delivered by a fiber 164 belonging to first section 152 to a coupler 166. Coupler 166 also receives pump radiation 116 from laser diode 156. The output of coupler 166 combines pump radiation 116 and first signal 160 and delivers them to fiber amplifier 168 of first section 152.

Fiber amplifier is designed in accordance with the above-described rules to amplify signal 160. In other words fiber amplifier 168 is designed to amplify short wavelength band 108. Preferably, fiber amplifier 168 is a first EDFA. First EDFA 168 is followed by a coupler 170 which is set to pass amplified signal 160' to a fiber 172 belonging to first section 152 and to pass pump radiation 116 to a coupler 174 belonging to second section 154.

Meanwhile, second signal 162 is delivered by a fiber 176 belonging to second section 154 to coupler 174. Coupler 174 combines pump radiation 116 undepleted by first EDFA 168 with second signal 162 and delivers them to amplifier 178 designed for amplifying long wavelength band 106. In this embodiment amplifier 178 is a second fiber amplifier, in particular a second EDFA. Second EDFA 178 amplifies signal 162 to yield an amplified signal 162'.

A combiner 180 combines amplified signal 160' from first branch 152 and amplified signal 162' from second branch 154. Combiner 180 is followed by an isolator 182 which passes only re-combined signal 104' and removes any residual pump radiation 116.

Apparatus 150 is very efficient in its use of pump source since it takes advantage of single common pump source 156. In particular, S-band fiber amplifier 168 is operated with the full pump power available in a co-pumping configuration, thereby enabling the highest inversion possible for the best S-band amplification performance. When an S-band EDFA is operated with very high inversion D, it naturally absorbs the pump radiation inefficiently, resulting in significant amounts of "wasted" pump light. Apparatus 150 takes advantage of this otherwise "wasted" pump light for pumping amplifier 178. Of course, a person skilled in the art will appreciate that apparatus 150 can be re-organized to use two pump sources and/or accommodate co-pumped and counter-pumped geometries. Furthermore, the fiber amplifiers can include several fiber amplifier sections separated by isolators as necessary. Use of "mid-span" isolation can improve noise figure and also net gain of an amplifier by eliminating backwards-propagating ASE that would otherwise rob power from the amplifier, depleting inversion, and thereby saturating the amplifier.

It will be clear to one skilled in the art that the above embodiments may be altered in many ways without departing from the scope of the invention. Accordingly, the scope of the invention should be determined by the following claims and their legal equivalents.

What is claimed is:

1. A split-band amplifying apparatus comprising:
 a) a first section for amplifying a long wavelength band of an optical signal;
 b) a second section having a fiber amplifier for amplifying a short wavelength band of said optical signal, said fiber amplifier comprising:
  1) a core having a core cross-section and a refractive index $n_o$;
  2) an active material doped in said core;
  3) a depressed cladding surrounding said core, said depressed cladding having a depressed cladding cross-section and a refractive index $n_1$;
  4) a secondary cladding surrounding said depressed cladding, said secondary cladding having a secondary cladding cross-section and a refractive index $n_2$;
  5) a pump source for pumping said active material to a high relative inversion D, such that said active material exhibits positive gains in said short wavelength band and high gains in said long wavelength band;
 wherein said core cross-section, said depressed cladding cross-section, and said refractive indices $n_o$, $n_1$, and $n_2$ are selected to produce a roll-off loss curve about a cutoff wavelength $\lambda_c$, said roll-off loss curve yielding losses at least comparable to said high gains in said long wavelength band and losses substantially smaller than said positive gains in said short wavelength band.

2. The split-band amplifying apparatus of claim 1, wherein said active material is Erbium such that said fiber amplifier is a first Erbium-doped fiber amplifier.

3. The split-band amplifying apparatus of claim 2, wherein said short wavelength band comprises at least a portion of the S-band and said long wavelength band comprises at least a portion of the C-band, and said cutoff wavelength $\lambda_c$ is at a crossover wavelength between said S-band and said C-band.

4. The split-band amplifying apparatus of claim 3, wherein said long wavelength band further comprises at least a portion of the L-band.

5. The split-band amplifying apparatus of claim 3, wherein said cutoff wavelength is at about 1530 nm.

6. The split-band amplifying apparatus of claim 1, wherein said first section comprises a second Erbium-doped fiber amplifier.

7. The split-band amplifying apparatus of claim 6, wherein said active material is Erbium such that said fiber amplifier is a first Erbium-doped fiber amplifier.

8. The split-band amplifying apparatus of claim 7, further comprising a common pump source for delivering a pump radiation to said first Erbium-doped fiber amplifier and to said second Erbium-doped fiber amplifier.

9. The split-band amplifying apparatus of claim 8, wherein said common pump source comprises a laser diode delivering said pump radiation at about 980 nm.

10. The split-band amplifying apparatus of claim 1, wherein said first section and said second section share an overlapping segment.

11. The split-band amplifying apparatus of claim 10, wherein said overlapping segment comprises a second Erbium-doped fiber amplifier for amplifying said long wavelength band.

12. A method for split-band amplification using a split-band amplifying apparatus, said method comprising:
   a) providing a first section for amplifying a long wavelength band of an optical signal;
   b) providing a second section having a fiber amplifier for amplifying a short wavelength band of said optical signal, said fiber amplifier being constructed by:
      1) providing a core having a core cross-section and a refractive index $n_o$;
      2) doping said active material into said core;
      3) providing a depressed cladding around said core, said depressed cladding having a depressed cladding cross-section and a refractive index $n_1$;
      4) providing a secondary cladding around said depressed cladding, said secondary cladding having a secondary cladding cross-section and a refractive index $n_2$;
      5) selecting said core cross section, said depressed cladding cross-section, and said refractive indices $n_o$, $n_1$, and $n_2$ to produce a roll-off loss curve about a cutoff wavelength $\lambda_c$, said roll-off loss curve yielding losses at least comparable to said high gains in said long wavelength band and losses substantially smaller than said positive gains in said short wavelength band.

13. The method of claim 12, further comprising selecting Erbium as said active material such that said fiber amplifier is a first Erbium-doped fiber amplifier.

14. The method of claim 13, further comprising counter-pumping said a first Erbium doped fiber amplifier.

15. The method of claim 12, further comprising providing said first section with a second Erbium-doped fiber amplifier for amplifying said long wavelength band.

16. The method of claim 15, further comprising selecting Erbium as said active material such that said fiber amplifier is a first Erbium-doped fiber amplifier.

17. The method of claim 16, further comprising co-pumping said first Erbium-doped fiber amplifier and said second Erbium-doped fiber amplifier from a common pump source.

18. The method of claim 17, wherein said common pump source delivers pump radiation at about 980 nm.

19. The method of claim 12, wherein said short wavelength band comprises at least a portion of the S-band and said long wavelength band comprises at least a portion of the C-band, and said cutoff wavelength $\lambda_c$ is set at a crossover wavelength between said S-band and said C-band.

20. The method of claim 19, wherein said long wavelength band further comprises at least a portion of the L-band.

21. The method of claim 19, wherein said cutoff wavelength $\lambda_c$ is set at about 1530 nm.

* * * * *